United States Patent
Noro et al.

(10) Patent No.: US 9,921,742 B2
(45) Date of Patent: Mar. 20, 2018

(54) INFORMATION PROCESSING APPARATUS AND RECORDING MEDIUM RECORDING INFORMATION PROCESSING PROGRAM

(71) Applicant: FUJITSU LIMITED, Kawasaki-shi, Kanagawa (JP)

(72) Inventors: Taichi Noro, Kawasaki (JP); Hideaki Joe, Funabashi (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 14/675,079

(22) Filed: Mar. 31, 2015

(65) Prior Publication Data
US 2015/0286398 A1 Oct. 8, 2015

(30) Foreign Application Priority Data
Apr. 8, 2014 (JP) .................. 2014-079478

(51) Int. Cl.
*G06F 3/0488* (2013.01)
(52) U.S. Cl.
CPC ................ *G06F 3/04883* (2013.01)
(58) Field of Classification Search
None
See application file for complete search history.

(56) References Cited

U.S. PATENT DOCUMENTS

| | | | |
|---|---|---|---|
| 5,880,743 A | 3/1999 | Moran et al. | |
| 2003/0179235 A1 | 9/2003 | Saund et al. | |
| 2004/0119763 A1 | 6/2004 | Mizobuchi et al. | |
| 2009/0164889 A1 | 6/2009 | Piersol et al. | |
| 2011/0018812 A1* | 1/2011 | Baird .................. | G06F 3/04886 345/173 |
| 2011/0081083 A1* | 4/2011 | Lee ...................... | G06K 9/2081 382/182 |
| 2011/0123115 A1* | 5/2011 | Lee ........................ | G06K 9/036 382/185 |

(Continued)

FOREIGN PATENT DOCUMENTS

| | | |
|---|---|---|
| JP | 06-131111 | 5/1994 |
| JP | 2012-243167 | 12/2012 |

(Continued)

OTHER PUBLICATIONS

EESR—The Extended European Search Report dated Aug. 7, 2015 issued in the corresponding European application No. 15162008.5.
(Continued)

*Primary Examiner* — Patrick Edouard
*Assistant Examiner* — Matthew Yeung
(74) *Attorney, Agent, or Firm* — Fujitsu Patent Center

(57) ABSTRACT

Provided is an information processing apparatus including: a processor; a touch panel; and a display, in which the processor receives input of touch coordinates through the touch panel, the processor determines, as a selected region, a character region from among a plurality of character regions in units of a predetermined number of characters on a screen that is currently displayed on the display and includes characters in a plurality of rows, the character region overlapping a touch track that is obtained by connecting the touch coordinates in order of inputting and continues in a plurality of rows, and the processor performs a predetermined process on the determined selected region.

3 Claims, 11 Drawing Sheets

(56) References Cited

U.S. PATENT DOCUMENTS

| | | |
|---|---|---|
| 2011/0307843 A1 | 12/2011 | Miyazaki et al. |
| 2012/0092269 A1 | 4/2012 | Tsai et al. |
| 2012/0117517 A1 | 5/2012 | Fradkin et al. |
| 2012/0188191 A1 | 7/2012 | Chen et al. |
| 2012/0306772 A1* | 12/2012 | Tan ................ G06F 3/0488 345/173 |
| 2012/0308127 A1 | 12/2012 | Kudoh et al. |
| 2013/0080979 A1* | 3/2013 | Weir ................ G06F 3/033 715/856 |
| 2013/0103383 A1 | 4/2013 | Du et al. |
| 2013/0249818 A1* | 9/2013 | Zhai ................ G06F 3/04883 345/173 |
| 2013/0311954 A1* | 11/2013 | Minkkinen ........ G06F 3/04812 715/862 |
| 2013/0326408 A1 | 12/2013 | Tsutsui |

FOREIGN PATENT DOCUMENTS

| | | |
|---|---|---|
| JP | 2013-178659 | 9/2013 |
| JP | 2013-250820 | 12/2013 |
| KR | 10-1275040 | 6/2013 |
| WO | 2011/074067 A1 | 6/2011 |
| WO | 2013/189372 A2 | 12/2013 |

OTHER PUBLICATIONS

JPOA—Office Action of Sep. 12, 2017 issued in the corresponding Japanese patent application No. 2014-079478, with machine translation.

* cited by examiner

RELATED ART

RELATED ART

MOVING DIRECTION OF TOUCH

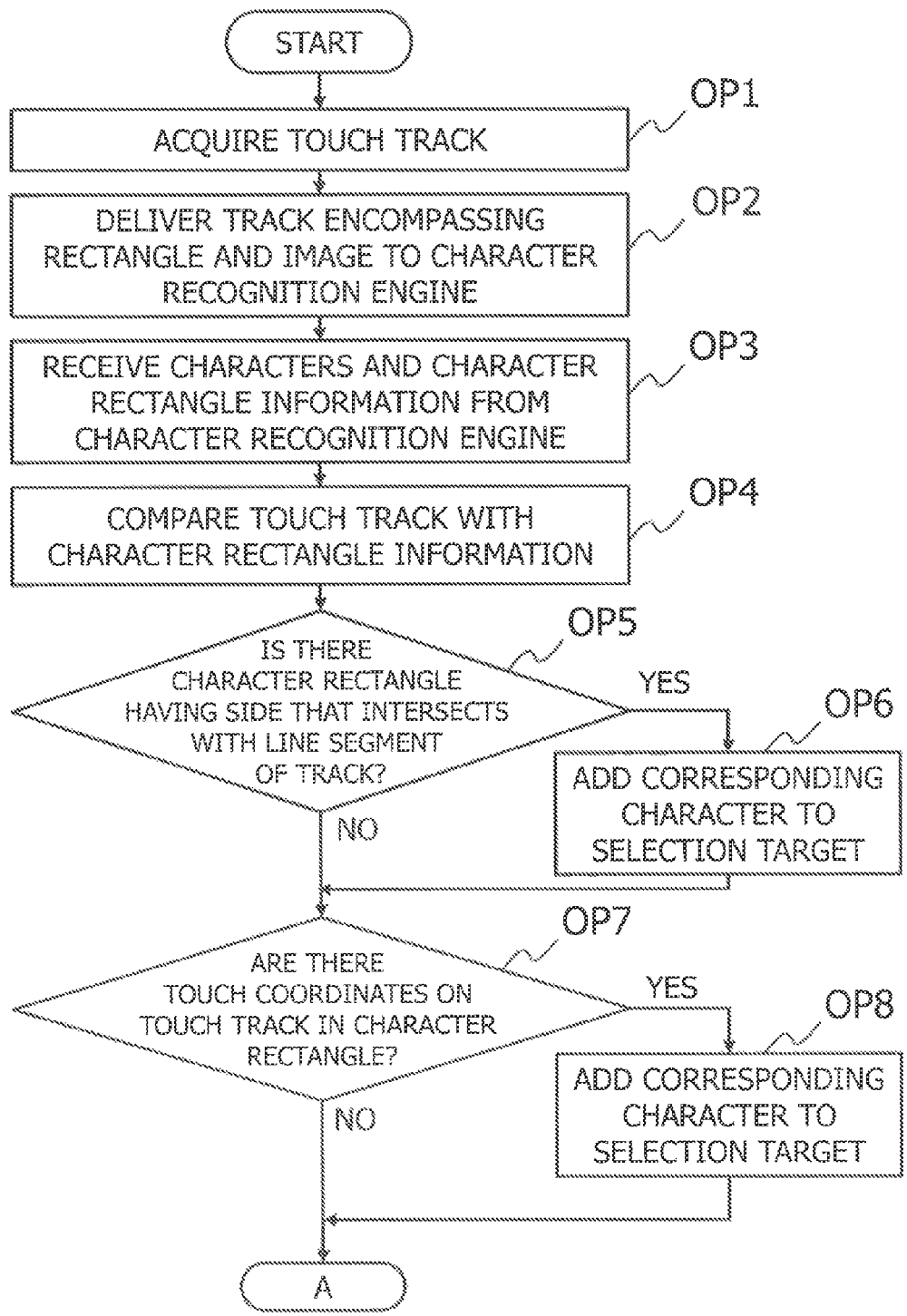

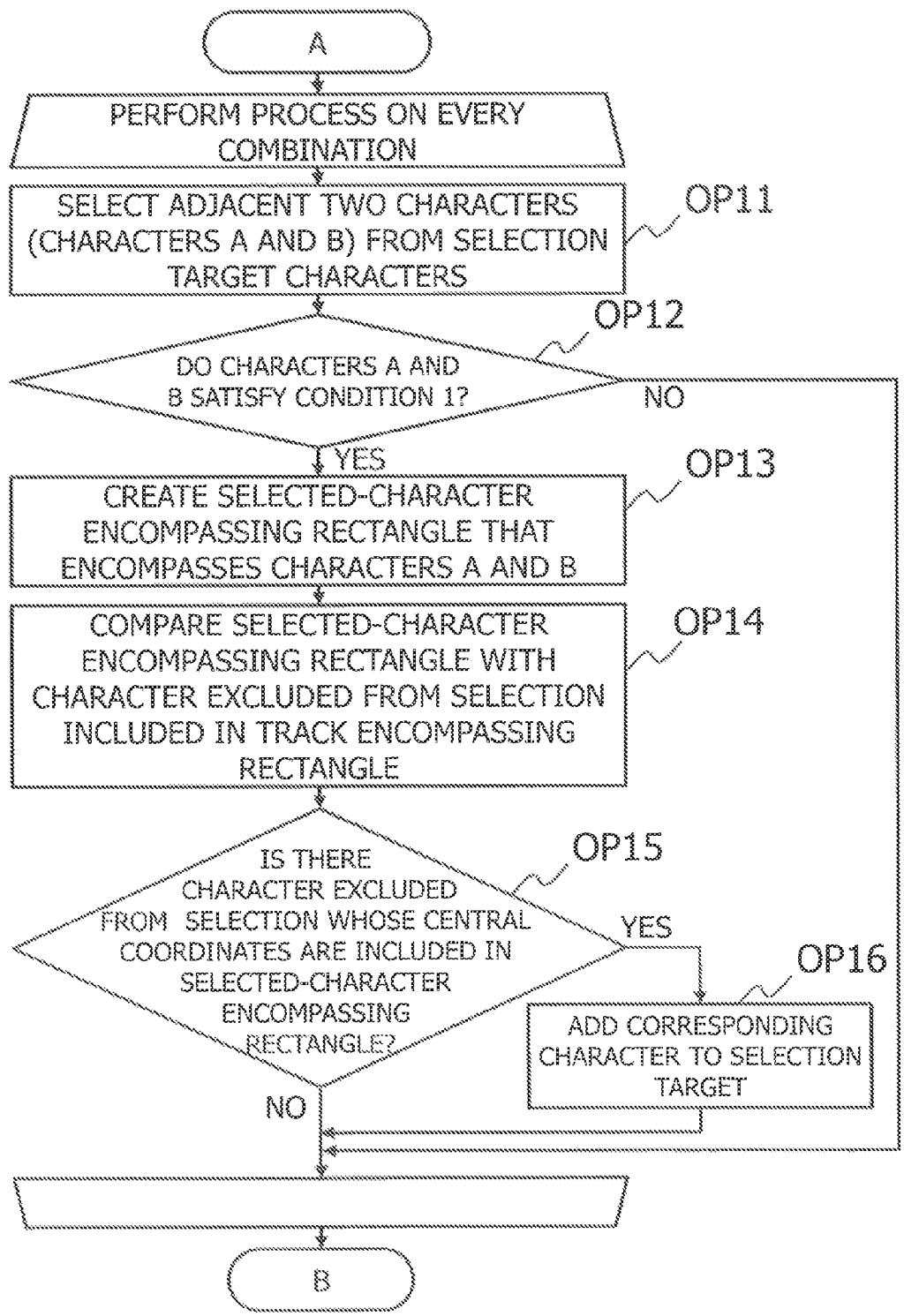

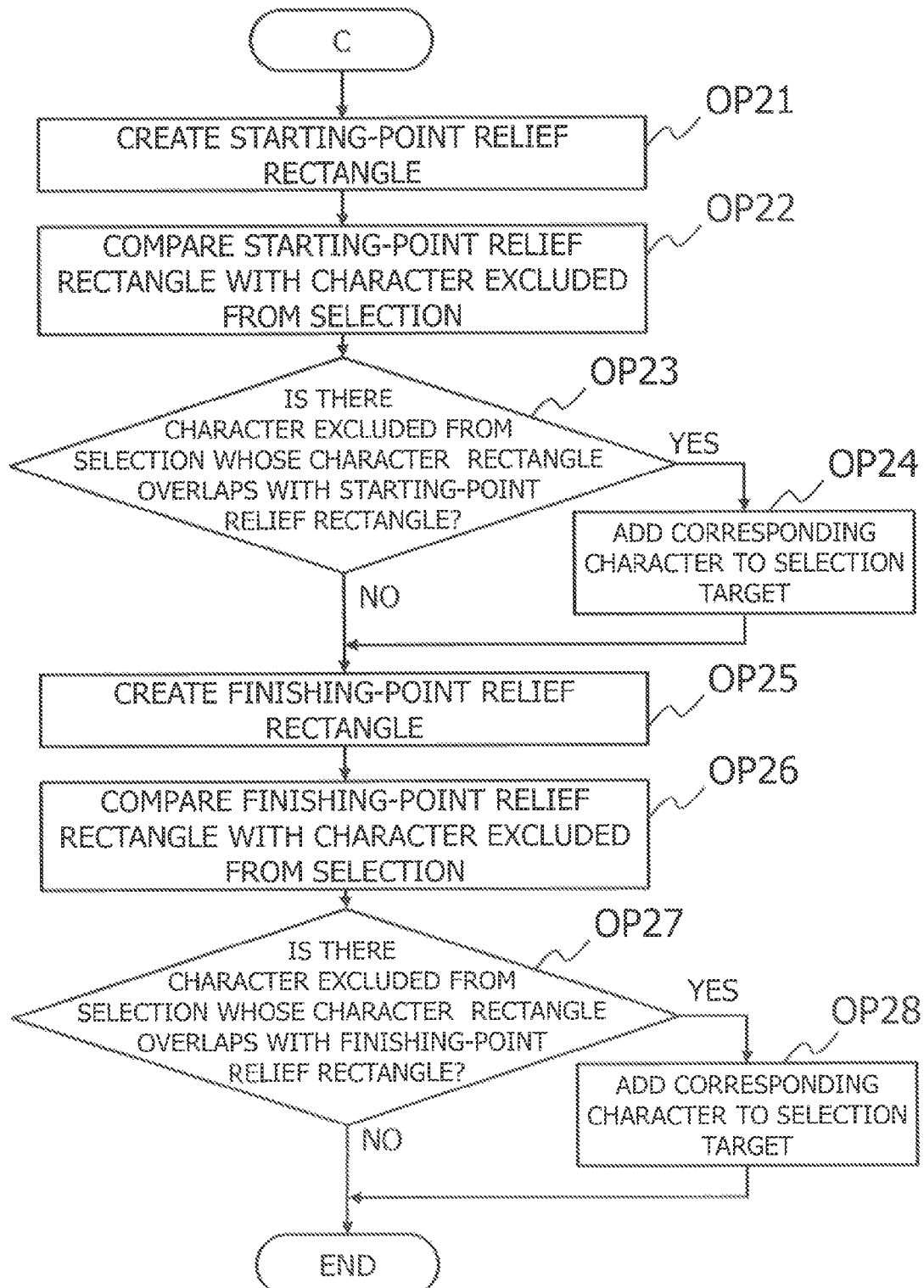

INFORMATION PROCESSING APPARATUS AND RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2014-079478, filed on Apr. 8, 2014, the entire contents of which are incorporated herein by reference.

FIELD

The present invention relates to an information processing apparatus and an information processing program capable of selecting characters displayed on a screen.

BACKGROUND

FIG. 1 and FIG. 2 are diagrams each illustrating an example of a method of selecting characters on a display screen of a mobile terminal including a touch panel. In FIG. 1 and FIG. 2, a region selected by a user is different in background color from the other region, and is highlighted.

In the example illustrated in FIG. 1, a rectangle that encompasses an entire track of a finger of the user on the touch panel is determined as the region selected by the user, and characters included in the region are determined to be selected. For example, in the case where the user touches the touch panel along a track indicated by an arrow in FIG. 1, a region including characters A, B, C, D, and E is highlighted as a selection target region so as to encompass the entire track. The selection target region is a region that is determined to be selected through a selection operation by the user. The selection target region is an example of a "selected region".

The example illustrated in FIG. 2 is a character selection process by a front-end processor (FEP) of a general touch panel. In the character selection process by the FEP, for example, the user touches (long taps) the touch panel for a predetermined period of time, whereby a predetermined range in the same row as the touched position as a reference is selected. The user can select characters by moving pointers respectively displayed at a starting point and a finishing point in the selected range.

For example, in the case where the user moves the pointer at the finishing point along a track indicated by an arrow in FIG. 2, characters continuous in units of one row are selected, and a row including the characters A and D, a row including the character B, and a row including the characters E and C are highlighted as the selection target region as illustrated in FIG. 2.

PATENT DOCUMENT

[Patent document 1] Japanese Patent Laid-Open No. 6(1994)-131111

Unfortunately, character selection processes through conventional touch panel operations has the following problem. For example, in the examples illustrated in FIG. 1 and FIG. 2, in the case where the user desires to select the characters A, B, and C and where his/her touch track passes on the characters A, B, and C as indicated by the arrows in FIG. 1 and FIG. 2, the undesired characters D and E are also selected in both the cases of FIG. 1 and FIG. 2.

Moreover, in the character selection processes in the examples illustrated in FIG. 1 and FIG. 2, if the user repeats an operation of selecting one of the characters A, B, and C and ending the character selection, the user can select the characters A, B, and C with the characters D and E not being included. This method however troubles the user.

SUMMARY

An aspect of the present invention provides an information processing apparatus including: a processor; a touch panel; and a display, in which the processor receives input of touch coordinates through the touch panel, the processor determines, as a selected region, a character region from among a plurality of character regions in units of a predetermined number of characters on a screen that is currently displayed on the display and includes characters in a plurality of rows, the character region overlapping a touch track that is obtained by connecting the touch coordinates in order of inputting and continues in a plurality of rows, and the processor performs a predetermined process on the selected region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A illustrates an example of a flowchart of a determination process for a selection target region by a determination unit;

FIG. 9B illustrates an example of the flowchart of the determination process for the selection target region by the determination unit; and FIG. 9C illustrates an example of the flowchart of the determination process for the selection target region by the determination unit.

DESCRIPTION OF EMBODIMENT

Hereinafter, an embodiment of the present invention is described with reference to the drawings. A configuration of the following embodiment is given as an example, and the present invention is not limited to the configuration of the embodiment.

First Embodiment

Figure 3:
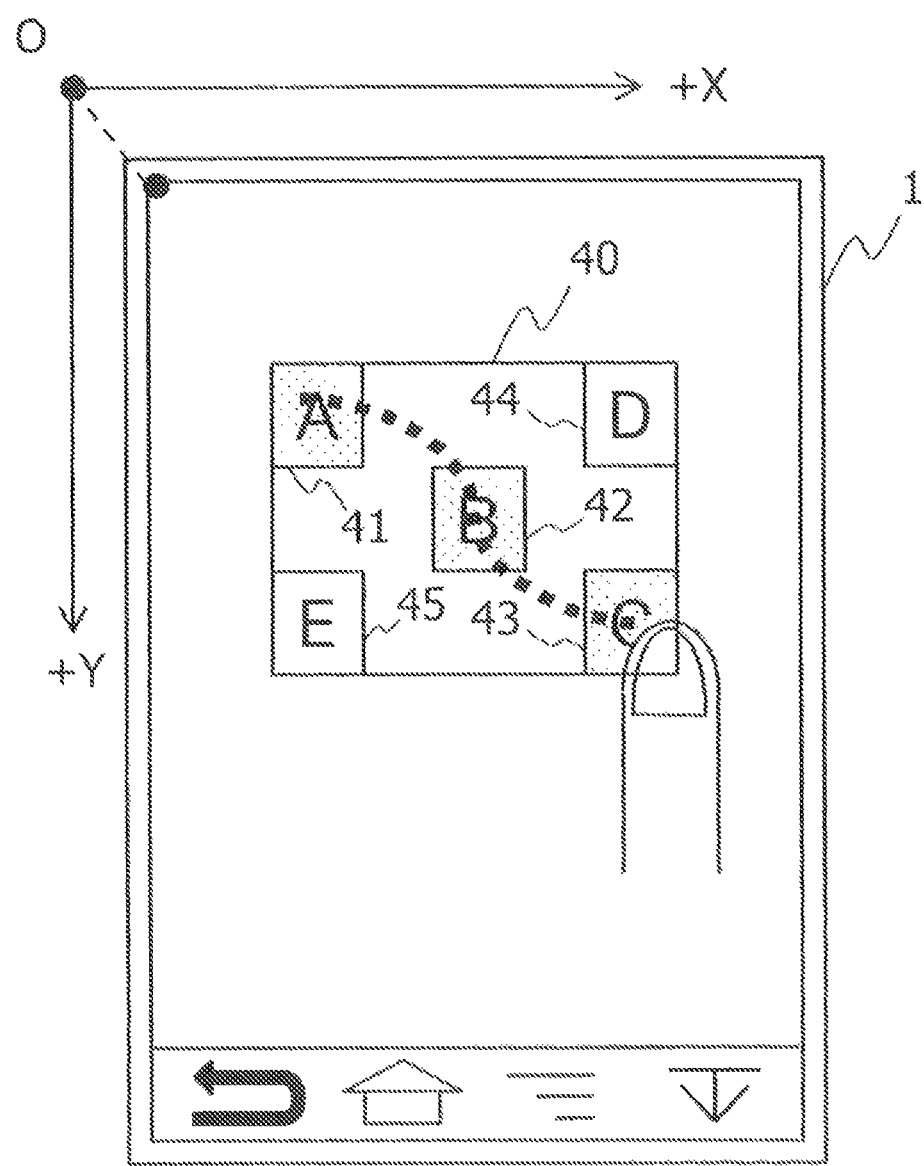
FIG. 3 is a diagram illustrating an example of a character selection process through a touch panel operation according to a first embodiment.

FIG. 3 is a diagram illustrating an example of a character selection process through a touch panel operation according to a first embodiment. In the first embodiment, a mobile terminal 1 performs a character recognition process on, for example, a rectangle that encompasses an entire touch track inputted through a touch panel, and acquires, for each character in the rectangle, a character rectangle including each character in units of one character. The mobile terminal 1 detects character rectangles that overlap with the touch track, as a selection target region.

For example, in the case where a touch track indicated by a dotted line in FIG. 3 is inputted, the mobile terminal 1 detects a rectangle 40 that encompasses the entire touch track, and performs the character recognition process on the rectangle 40. As a result of the character recognition process, respective character rectangles 41, 42, 43, 44, and 45 of characters A, B, C, D, and E are detected. The mobile terminal 1 detects, as the selection target region, the character rectangles 41, 42, and 43 of the characters A, B, and C that overlap with the touch track, from among the detected character rectangles.

The character rectangles 44 and 45 of the characters D and E that do not overlap with the touch track are not included in the selection target region, and hence a user can easily select the characters A, B, and C. Moreover, the mobile terminal 1 according to the first embodiment can detect a character region selected by the user, as desired by the user. Note that the rectangle 40 that encompasses the entire touch track and the character rectangles 41 to 45 are not displayed on a display.

In the first embodiment, in a coordinate system on a display screen of the mobile terminal 1, the horizontal direction in FIG. 3 is an X axis, and the vertical direction in FIG. 3 is a Y axis. Moreover, facing the sheet of FIG. 3, the upper left vertex on the display screen is defined as an origin O. Facing the sheet of FIG. 3, the right direction from the origin O is a +X direction, and the left direction therefrom is a −X direction. Facing the sheet of FIG. 3, the lower direction from the origin O is a +Y direction, and the upper direction therefrom is a −Y direction. Note that the definition of the coordinate system on the display screen of the mobile terminal 1 is not limited thereto.

Figure 4:
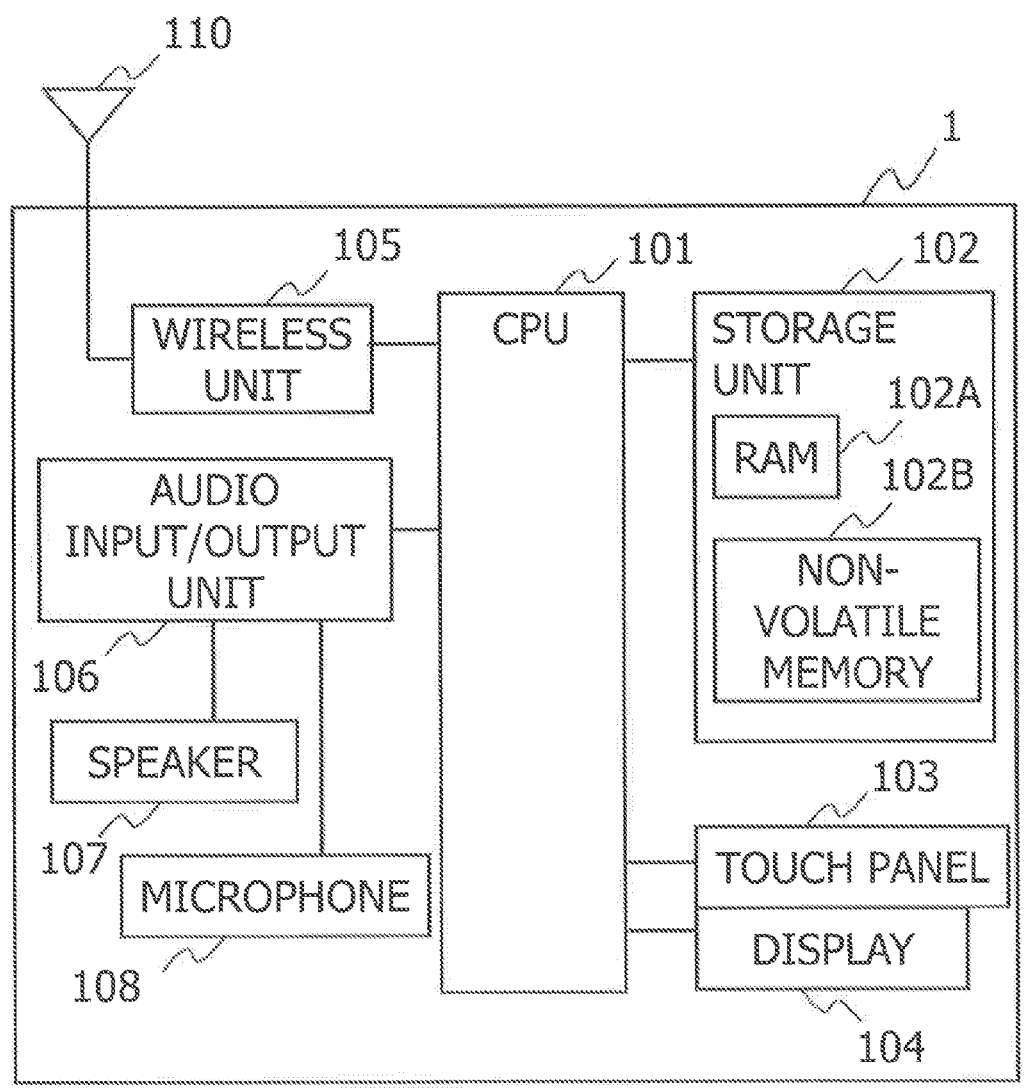
FIG. 4 is a diagram illustrating an example of a hardware configuration of a mobile terminal.

FIG. 4 is a diagram illustrating an example of a hardware configuration of the mobile terminal 1. The mobile terminal 1 is, for example, a computer including a touch panel, such as a smartphone, a tablet terminal, a portable game machine, and a music player. The mobile terminal 1 includes a central processing unit (CPU) 101, a storage unit 102, a touch panel 103, a display 104, a wireless unit 105, an audio input/output unit 106, a speaker 107, a microphone 108, and an antenna 110. The mobile terminal 1 is an example of an "information processing apparatus".

The storage unit 102 includes a random access memory (RAM) 102A and a non-volatile memory 102B. The RAM 102A is, for example, a volatile memory such as a DRAM, and provides a work area to the CPU 101. The non-volatile memory 102B is, for example, a flash memory, and stores data and the like used by an operating system (OS), various programs, and execution of the programs.

The non-volatile memory 102B stores therein a character recognition engine, a rectangle detection program, and a character selection determination program. The character recognition engine is, for example, middleware for recognizing characters through optical character recognition (OCR). The rectangle detection program is a program for detecting a rectangle that encompasses a touch track. The character selection determination program is a program for detecting, as the selection target region, a character rectangle that overlaps with the touch track, and is middleware in the first embodiment. The character selection determination program is an example of an "information processing program".

The CPU 101 develops the programs stored in the non-volatile memory 102B onto the work area of the RAM 102A, and executes developed commands, to thereby control hardware components.

The touch panel 103 is one of position input devices, is placed on a surface of the display 104, and receives input of the coordinates of a touch position of a finger corresponding to a screen of the display 104. The coordinates of the touch position on the touch panel 103 are hereinafter referred to as touch coordinates. In the first embodiment, the touch panel 103 is of capacitive type. The present invention is not limited thereto. For example, the touch panel 103 may be of resistive type, surface acoustic wave type, infrared type, and electromagnetic induction type. The touch panel 103 samples the touch coordinates in a cycle of, for example, 10 ms. Moreover, the touch panel 103 acquires, as the touch coordinates, for example, the coordinates of the central point of a contact area and coordinates obtained by correcting the coordinates of the central point of the contact area.

The display 104 is, for example, a liquid crystal display (LCD). The display 104 displays screen data according to a signal inputted from the CPU 101.

The wireless unit 105 is connected to the antenna 110. The wireless unit 105 converts a radio signal received through the antenna 110 into an electrical signal, and outputs the electrical signal to the CPU 101. The wireless unit 105 converts an electrical signal inputted from the CPU 101 into a radio signal, and transmits the radio signal through the antenna 110. The wireless unit 105 is, for example, an electronic circuit corresponding to any one or more of 3G, 2G, and Long Term Evolution (LTE).

The audio input/output unit 106 is connected to the speaker 107 as an audio output device and the microphone 108 as an audio input device. The audio input/output unit 106 converts an audio signal inputted from the microphone 108 into an electrical signal, and outputs the electrical signal to the CPU 101. The audio input/output unit 106 converts an electrical signal inputted from the CPU 101 into an audio signal, and outputs the audio signal to the speaker 107.

Note that the hardware configuration of the mobile terminal 1 is not limited to that illustrated in FIG. 4, and changes such as addition, replacement, and omission can be made thereto as appropriate. For example, the mobile terminal 1 may include an infrared communication unit and an IC card communication unit in addition to the configuration illustrated in FIG. 4.

Figure 5:
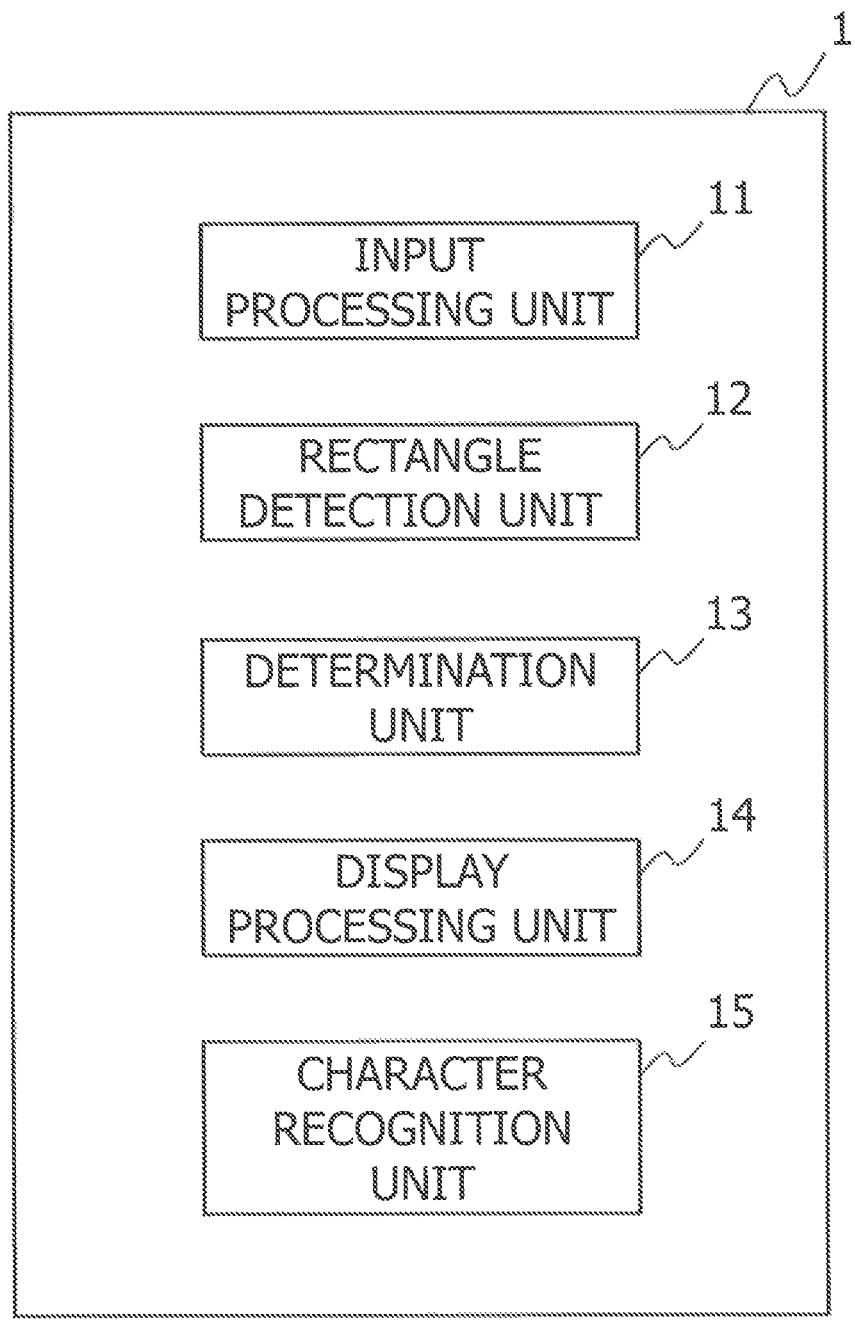
FIG. 5 is a diagram illustrating an example of a function configuration of the mobile terminal.

FIG. 5 is a diagram illustrating an example of a function configuration of the mobile terminal 1. The mobile terminal 1 includes, as its function configuration, an input processing unit 11, a rectangle detection unit 12, a determination unit 13, a display processing unit 14, and a character recognition unit 15. The input processing unit 11, the determination unit 13, and the display processing unit 14 are function configurations that are achieved by executing, by the CPU 101, the character selection determination program stored in the non-volatile memory 102B. Note that the present invention is not limited thereto, and these function configurations may be achieved by, for example, using hardware such as a FPGA. The rectangle detection unit 12 is a function configuration achieved by executing, by the CPU 101, the rectangle detection program stored in the non-volatile memory 102B. The character recognition unit 15 corresponds to the character recognition engine stored in the non-volatile memory 102B.

The input processing unit 11 receives touch coordinates on the touch panel 103 that are inputted from the touch panel 103, and reports the touch coordinates to the rectangle detection unit 12 and the determination unit 13. For example, the touch panel 103 performs scanning with a sensor in a predetermined cycle. If detecting a change in capacitance, the touch panel 103 acquires the coordinates of the change in capacitance, and outputs the coordinates as the touch coordinates to the input processing unit 11. That is, the touch coordinates are inputted from the touch panel 103 to the input processing unit 11 in the predetermined cycle, while a touch on the touch panel 103 is being detected. The predetermined cycle is, for example, 10 ms.

The rectangle detection unit 12 receives input of the touch coordinates from the input processing unit 11, connects the touch coordinates with a straight line in the order of inputting to acquire a touch track, and detects a rectangle that encompasses the touch track. The rectangle that encompasses the entire touch track is hereinafter referred to as a track encompassing rectangle. The rectangle detection unit 12 detects, for example, a rectangle including the entire touch track and all characters that overlap with the touch track, as the track encompassing rectangle. The rectangle detection unit 12 outputs information on the track encompassing rectangle to the determination unit 13. The information on the track encompassing rectangle includes, for example: the coordinates of a vertex whose X and Y coordinates both have smallest values, of the four vertexes of the track encompassing rectangle; the coordinates of a vertex whose X and Y coordinates both have largest values, of the four vertexes of the track encompassing rectangle; and the size of the track encompassing rectangle.

The determination unit 13 determines character rectangles selected by the touch track inputted through the touch panel 103. More detailed description thereof is given below. Upon reception of the touch coordinates on the touch panel 103 from the input processing unit 11, the determination unit 13 connects the touch coordinates with a straight line in the order of inputting to acquire a touch track. Then, the determination unit 13 acquires the track encompassing rectangle from the rectangle detection unit 12, and requests the character recognition unit 15 to perform the character recognition process on a partial image corresponding to the track encompassing rectangle, of an image currently displayed on the display 104. Upon acquisition of information on the character rectangle of each character included in the track encompassing rectangle from the character recognition unit 15, the determination unit 13 detects character rectangles that overlap with the touch track, detects the character rectangles as the selection target region, and outputs information on the selection target region to the display processing unit 14. The information on the selection target region includes, for example: the coordinates of a vertex whose X and Y coordinates both have smallest values, of the vertexes of each character rectangle included in the selection target region; the coordinates of a vertex whose X and Y coordinates both have largest values, of the vertexes of each character rectangle included in the selection target region; and a size. The details of the process by the determination unit 13 are described later.

Upon input of the information on the selection target region from the determination unit 13, the display processing unit 14, for example, changes the background color of the selection target region to a color different from the background color of the other region or changes the character color in the selection target region, thus generates a screen on which the selection target region is highlighted, and outputs the screen to the display 104.

In response to the request from the determination unit 13, the character recognition unit 15 performs the character recognition process on the partial image corresponding to the track encompassing rectangle. As a result of the character recognition process, the character recognition unit 15 acquires: characters included in the partial image corresponding to the track encompassing rectangle; and the character rectangle of each character. The character recognition unit 15 outputs, for example: the characters included in the track encompassing rectangle; the coordinates of a vertex whose X and Y coordinates both have smallest values, of the character rectangle of each character; the coordinates of a vertex whose X and Y coordinates both have largest values, of the character rectangle of each character; and sizes, to the determination unit 13.

Note that the character rectangle acquired by the character recognition unit 15 is, for example, a rectangle whose vertexes are four points of the points that draw the character, the four points being obtained by a combination of the smallest X coordinate and the smallest Y coordinate, the largest X coordinate and the smallest Y coordinate, the smallest X coordinate and the largest Y coordinate, and the largest X coordinate and the largest Y coordinate. Hence, even in the case of the same font and the same font size, the character rectangle size is different for each character. Note that, not limited to units of one character, the character rectangle detected by the character recognition unit 15 may be formed in units of a predetermined number of characters that is equal to or more than two and is less than the number of characters included in one row. In the first embodiment, the character rectangle is formed in units of one character. The character rectangle is an example of a "character region".

Figure 6:
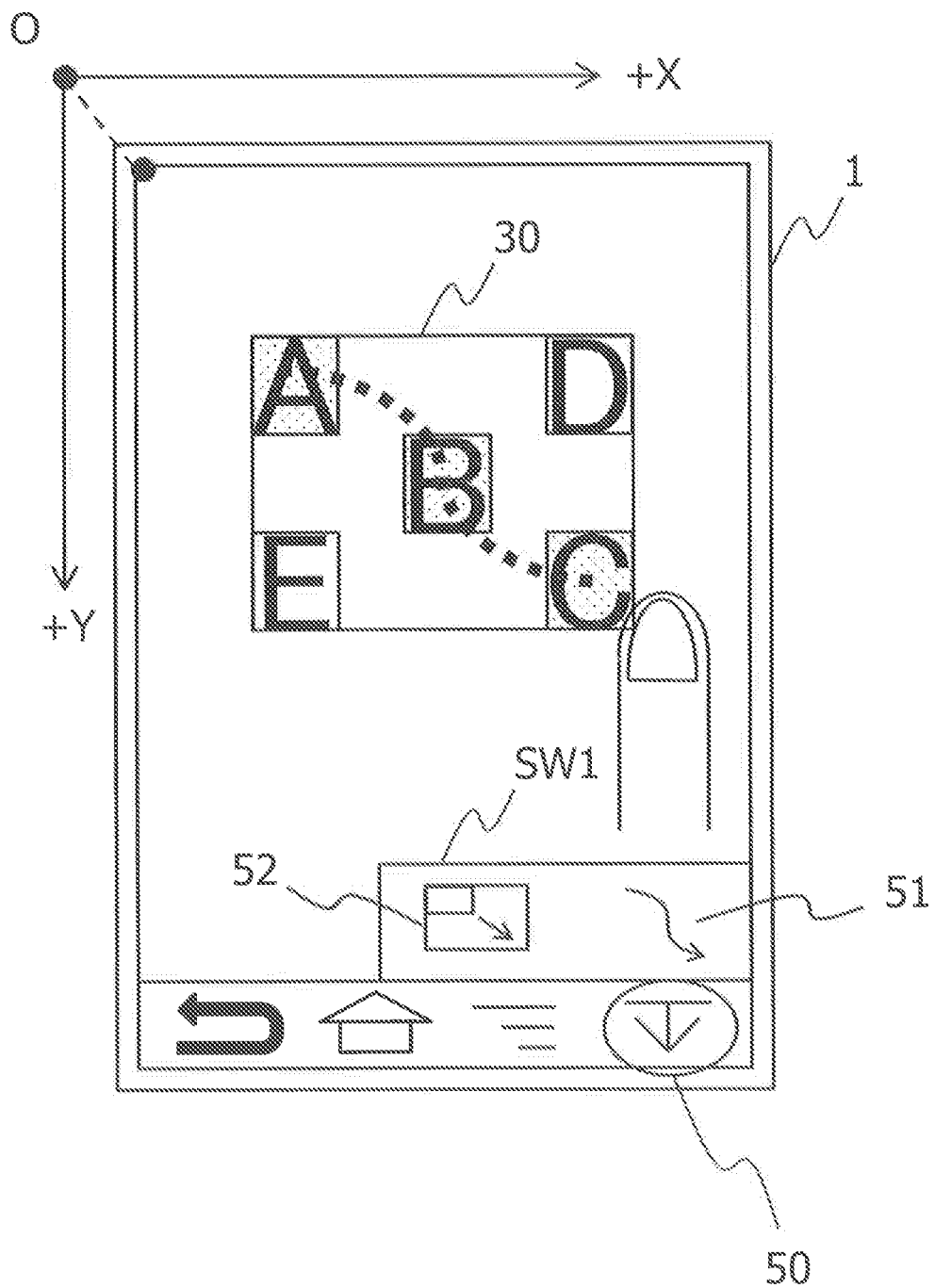
FIG. 6 illustrates one of display screen examples of the mobile terminal.

FIG. 6 illustrates one of display screen examples of the mobile terminal 1. In the first embodiment, the character selection determination program is middleware, and is activated without depending on a particular application. In the first embodiment, a character selection menu icon 50 for selecting a character selection method is always displayed in a lower part of the display screen of the mobile terminal 1. If the user touches the character selection menu icon 50, a sub-window SW1 is displayed.

Figure 1:
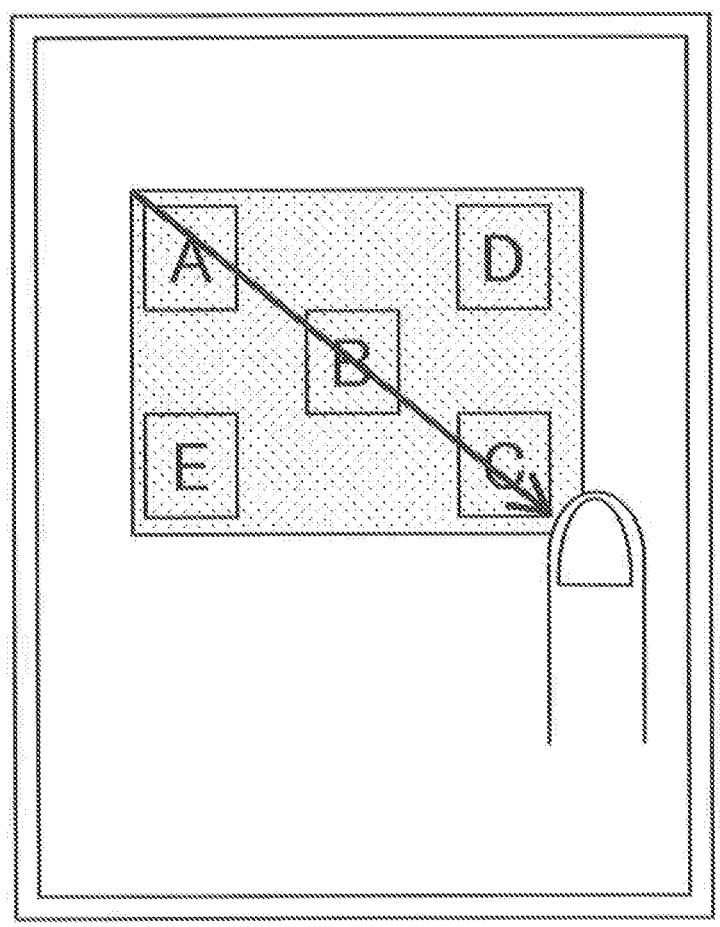
FIG. 1 is a diagram illustrating an example of a method of selecting characters on a display screen of a mobile terminal including a touch panel.
Figure 2:
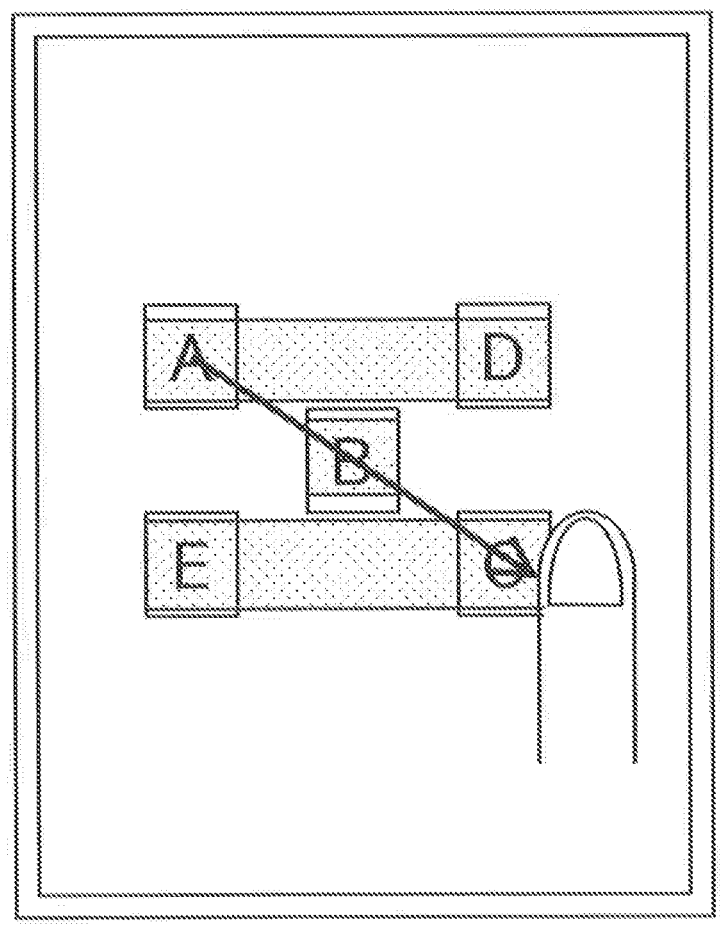
FIG. 2 is a diagram illustrating an example of a method of selecting characters on a display screen of a mobile terminal including a touch panel.

The sub-window SW1 includes an icon 51 and an icon 52. The icon 51 is an icon for activating the character selection determination program. The icon 52 is, for example, an icon for activating a character selection process by a FEP. If the user touches the icon 51, the character selection determination program is activated. If the user touches the icon 52, for example, a character selection process by a FEP as in the example illustrated in FIG. 2 is performed. Note that the icon 52 may be an icon for activating a character selection process in which characters included in a rectangle are selected, as in the example illustrated in FIG. 1.

In FIG. 6, the touch track of the user is indicated by a dotted line. In the case of the touch track illustrated in FIG. 6, a rectangle 30 including the entire touch track and all characters that overlap with the touch track is detected as the track encompassing rectangle.

Upon input of the information on the track encompassing rectangle from the determination unit 13, the character recognition unit 15 performs the character recognition process on the track encompassing rectangle. In the example illustrated in FIG. 6, information on the character rectangles of the characters A, B, C, D, and E is outputted to the determination unit 13. Moreover, in the example illustrated in FIG. 6, the determination unit 13 detects, as the selection target region, the character rectangles of the characters A, B, and C that overlap with the touch track. In the example illustrated in FIG. 6, the character rectangles of the characters A, B, and C detected as the selection target region are displayed in a background color different from that of the other region.

Figure 7:
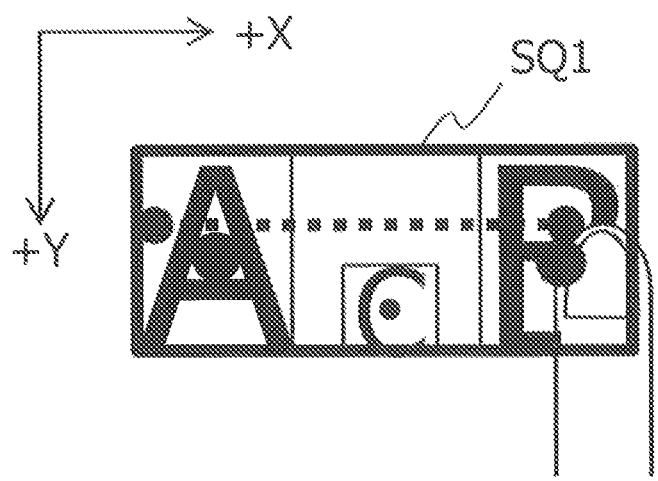
FIG. 7 is a diagram illustrating an example of a relief process 1 for a character excluded from selection.

FIG. 7 is a diagram illustrating an example of a relief process 1 for a character excluded from selection. For example, character regions having small character rectangle sizes, of contracted sounds (small-sized hiragana or katakana characters "ya", "yu", and "yo" in Japanese), double consonants (a small-sized hiragana or katakana character "tsu" in Japanese), punctuation marks, and the like do not overlap with the touch track, and are excluded from detection as the selection target region in some cases. The relief process 1 for a character excluded from selection is a process for detecting, as the selection target region, a character rectangle sandwiched between character rectangles that overlap with the touch track.

In FIG. 7, the touch track is indicated by a dotted line. The character rectangles of the characters A and B overlap with the touch track. The character C sandwiched between the characters A and B does not overlap with the touch track, for the reason of having a small character rectangle size. However, because the character C is sandwiched between the characters A and B that overlap with the touch track, the character C is estimated to be one of the characters desired by the user. Hence, in the relief process 1 for a character excluded from selection, the character rectangle of the character C is also detected as the selection target region.

In the case where there is a character rectangle sandwiched between two character rectangles that satisfy <Condition 1> described below, of the character rectangles that overlap with the touch track, the determination unit 13 also detects, as the selection target region, the character rectangle sandwiched between the two character rectangles. <Condition 1> is, for example, a condition that the Y coordinate of the central point of the character rectangle of the character B located in the +X direction is larger than the Y coordinate of the side on the −Y direction side of the character rectangle of the character A located in the −X direction, and is smaller than the Y coordinate of the side on the +Y direction side of the character rectangle of the character A. Note that <Condition 1> described above applies to horizontal writing, and X and Y in the predetermined condition described above are replaced with each other in the case of vertical writing.

The determination unit 13 creates a rectangle that encompasses two character rectangles that satisfy <Condition 1>. The rectangle that encompasses the two character rectangles that satisfy <Condition 1> is hereinafter referred to as a selected-character encompassing rectangle, and is denoted by reference symbol SQ1. In the case of horizontal writing, the selected-character encompassing rectangle is, for example, a rectangle whose vertexes are the following four points (X, Y), if the characters A and B in FIG. 7 are taken as an example.

(The X coordinate of the side on the −X direction side of the character rectangle of the character A, the smallest Y coordinate of the character rectangles of the characters A and B)

(The X coordinate of the side on the −X direction side of the character rectangle of the character A, the largest Y coordinate of the character rectangles of the characters A and B)

(The X coordinate of the side on the +X direction side of the character rectangle of the character B, the smallest Y coordinate of the character rectangles of the characters A and B)

(The X coordinate of the side on the +X direction side of the character rectangle of the character B, the largest Y coordinate of the character rectangles of the characters A and B)

Note that X and Y in the above four points are replaced with each other in the case of vertical writing.

Figure 8:
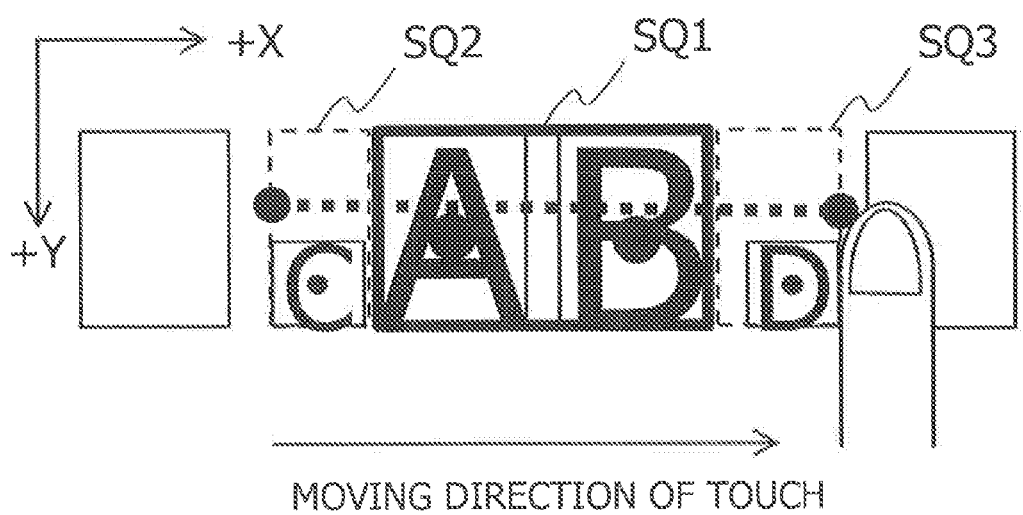
FIG. 8 is a diagram illustrating an example of a relief process 2 for a character excluded from selection.

FIG. 8 is a diagram illustrating an example of a relief process 2 for a character excluded from selection. The relief process 2 for a character excluded from selection is a process for detecting, as the selection target region, small-sized character rectangles of punctuation marks and the like, the character rectangles being highly likely to be located at end points of the touch track. In the relief process 2 for a character excluded from selection, a given character rectangle is also detected as the selection target region even if the given character rectangle does not overlap with the touch track, the given character rectangle being included in a range from an end point of the touch track to a side of a selected-character encompassing rectangle closest to the end point, within the same row as the closest selected-character encompassing rectangle.

In FIG. 8, the touch track is indicated by a dotted line. The character rectangles of the characters A and B overlap with the touch track. The character C located in the −X direction of the character A and the character D located in the +X direction of the character B do not overlap with the touch track, for the reason of having a small character rectangle size. However, because the character C (D) is included in a range from an end point of the touch track to a side of a selected-character encompassing rectangle including the character A (B) closest to the end point, within the same row as the closest selected-character encompassing rectangle, the character rectangles of the characters C and D are also detected as the selection target region.

The range from an end point of the touch track to a side of a selected-character encompassing rectangle closest to the end point, within the same row as the closest selected-character encompassing rectangle is specifically described below. One range is a rectangle whose vertexes are four points of: the two vertexes on the −X direction side of the selected-character encompassing rectangle SQ1; the X coordinate of the end point on the −X direction side of the touch track and the smallest Y coordinate of the vertexes of the selected-character encompassing rectangle SQ1; and the X coordinate of the end point on the −X direction side of the touch track and the largest Y coordinate of the vertexes of the selected-character encompassing rectangle SQ1. In the example illustrated in FIG. 8, the end point on the −X direction side of the touch track is the starting point of the touch track, and the rectangle on the starting point side of the touch track is hereinafter referred to as a starting-point relief rectangle. Moreover, the starting-point relief rectangle is denoted by reference symbol SQ2.

Another range is one of predetermined ranges from both the ends of the touch track, and is a rectangle whose vertexes are four points of: the two vertexes on the +X direction side of the selected-character encompassing rectangle SQ1; the X coordinate of the end point on the +X direction side of the touch track and the smallest Y coordinate of the vertexes of the selected-character encompassing rectangle SQ1; and the X coordinate of the end point on the +X direction side of the touch track and the largest Y coordinate of the vertexes of the selected-character encompassing rectangle SQ1. In the example illustrated in FIG. 8, the end point on the +X direction side of the touch track is the finishing point of the touch track, and the rectangle on the finishing point side of the touch track is hereinafter referred to as a finishing-point relief rectangle. Moreover, the finishing-point relief rectangle is denoted by reference symbol SQ3.

The determination unit 13 obtains the starting-point relief rectangle and the finishing-point relief rectangle, and adds character rectangles that do not overlap with the touch track but overlap with the starting-point relief rectangle or the finishing-point relief rectangle, to the selection target region.

<Process Flow>

FIG. 9A, FIG. 9B, and FIG. 9C illustrate an example of a flowchart of a determination process for the selection target region by the determination unit 13. For example, if the user touches the icon 51 to activate the character selection determination program, the process illustrated in FIG. 9A is started.

In OP1, the determination unit 13 receives input of touch coordinates from the input processing unit 11, and acquires a touch track. The process then proceeds to OP2.

In OP2, the determination unit 13 acquires a track encompassing rectangle from the rectangle detection unit 12, delivers: a partial image corresponding to the track encompassing rectangle, of an image displayed on the display 104; and information on the track encompassing rectangle, to the character recognition unit 15, and requests the character recognition unit 15 to perform the character recognition process on the partial image corresponding to the track encompassing rectangle. The information on the track encompassing rectangle delivered to the character recognition unit 15 is, for example, the coordinates of a vertex whose X and Y coordinates both have smallest values and a vertex whose X and Y coordinates both have largest values, of the vertexes of the track encompassing rectangle. The process then proceeds to OP3.

In OP3, as a result of the character recognition process, the determination unit 13 receives characters included in the track encompassing rectangle and character rectangle information from the character recognition unit 15. The character rectangle information is, for example, the coordinates of a vertex whose X and Y coordinates both have smallest values and a vertex whose X and Y coordinates both have largest values, of each character rectangle and the size of each character rectangle. The process then proceeds to OP4.

In OP4, the determination unit 13 compares the touch track with the character rectangle information. The process then proceeds to OP5.

In OP5, the determination unit 13 determines whether or not there is a character rectangle having a side that intersects with a line segment included in the touch track. The line segment included in the touch track refers to a line segment that connects two continuously inputted touch coordinates. Whether or not a line segment included in the touch track and a line segment of the character rectangle intersect with each other can be determined on the basis of the touch coordinates and the coordinates of two vertexes of each character rectangle included in the character rectangle information. If there is a character rectangle having a side that intersects with a line segment included in the touch track (OP5: YES), the process proceeds to OP6. If there is not a character rectangle having a side that intersects with a line segment included in the touch track (OP5: NO), the process proceeds to OP7.

In OP6, the determination unit 13 adds a character in the character rectangle having the side that intersects with the line segment included in the touch track, to the selection target. The process then proceeds to OP7.

In OP7, the determination unit 13 determines whether or not there is a character rectangle that encompasses the touch coordinates on the touch track. This determination is performed by, for example, determining whether or not the X coordinate and the Y coordinate of the touch coordinates respectively fall within a range from the smallest X coordinate to the largest X coordinate and a range from the smallest Y coordinate to the largest Y coordinate of each character rectangle included in the character rectangle information. If there is a character rectangle that encompasses the touch coordinates on the touch track (OP7: YES), the process proceeds to OP8. If there is not a character rectangle that encompasses the touch coordinates on the touch track (OP7: NO), the process proceeds to OP11 in FIG. 9B.

In OP8, the determination unit 13 adds a character in the character rectangle that encompasses the touch coordinates on the touch track, to the selection target. Accordingly, a character rectangle that encompasses the touch track that does not intersect with each character rectangle but is encompassed in the character rectangle can be added to the selection target region. The process then proceeds to OP11 in FIG. 9B.

The process illustrated in FIG. 9B is a process corresponding to the relief process 1 for a character excluded from selection. The process illustrated in FIG. 9B is performed on every combination of adjacent two characters on the touch track, of the selection target characters extracted in the process illustrated in FIG. 9A.

In OP11, the determination unit 13 selects a combination of adjacent two selection target characters on the touch track. For convenience sake, the selected two characters are defined as characters A and B. The process then proceeds to OP12.

In OP12, the determination unit 13 determines whether or not the two character rectangles of the selected characters A and B satisfy <Condition 1> described above. If the two character rectangles of the selected characters A and B satisfy <Condition 1> (OP12: YES), the process proceeds to OP13. If the two character rectangles of the selected characters A and B do not satisfy <Condition 1> (OP12: NO), the process returns to OP11 and a combination of the next two selection target characters is processed, or the process proceeds to OP21 in FIG. 9C.

In OP13, the determination unit 13 creates a selected-character encompassing rectangle that encompasses the character rectangles of the characters A and B. The process then proceeds to OP14.

In OP14, the determination unit 13 compares the selected-character encompassing rectangle with a character that is included in the track encompassing rectangle and is not selected as the selection target. The character that is not selected as the selection target is hereinafter referred to as a character excluded from selection. The process then proceeds to OP15.

In OP15, the determination unit 13 determines whether or not there is a character excluded from selection whose central coordinates of the character rectangle are included in the selected-character encompassing rectangle. The central coordinates of the character rectangle are calculated on the basis of the coordinates of a vertex whose X and Y coordinates have smallest values and the coordinates of a vertex whose X and Y coordinates have largest values, of the character rectangle acquired from the character recognition unit 15. If there is a character excluded from selection whose central coordinates of the character rectangle are included in the selected-character encompassing rectangle (OP15: YES), the process proceeds to OP16. If there is not a character excluded from selection whose central coordinates of the character rectangle are included in the selected-character encompassing rectangle (OP15: NO), the process returns to OP11 and a combination of the next two selection target characters is processed, or the process proceeds to OP21 in FIG. 9C.

In OP16, the determination unit 13 adds the character excluded from selection whose central coordinates of the character rectangle are included in the selected-character encompassing rectangle, to the selection target. Then, the process returns to OP11 and a combination of the next two selection target characters is processed, or the process proceeds to OP21 in FIG. 9C if every combination of two selection target characters on the touch track has been processed in OP11 to OP16.

The process illustrated in FIG. 9C is a process corresponding to the relief process 2 for a character excluded from selection. In OP21, the determination unit 13 creates a starting-point relief rectangle. The process then proceeds to OP22. Note that, in the case where the starting point of the touch coordinates is included in any of the character rectangles, the determination unit 13 does not create a starting-point relief rectangle, and the process proceeds to OP25.

In OP22, the determination unit 13 compares the starting-point relief rectangle with each character excluded from selection. The process then proceeds to OP23.

In OP23, the determination unit 13 determines whether or not there is a character excluded from selection whose character rectangle overlaps with the starting-point relief rectangle. If there is a character excluded from selection whose character rectangle overlaps with the starting-point relief rectangle (OP23: YES), the process proceeds to OP24. If there is not a character excluded from selection whose character rectangle overlaps with the starting-point relief rectangle (OP23: NO), the process proceeds to OP25.

In OP24, the determination unit 13 adds the character excluded from selection whose character rectangle overlaps with the starting-point relief rectangle, to the selection target. The process then proceeds to OP25.

In OP25, the determination unit 13 creates a finishing-point relief rectangle. The process then proceeds to OP26. Note that, in the case where the finishing point of the touch coordinates is included in any of the character rectangles, the determination unit 13 does not create a finishing-point relief rectangle, and the process illustrated in FIG. 9C is ended.

In OP26, the determination unit 13 compares the finishing-point relief rectangle with each character excluded from selection. The process then proceeds to OP27.

In OP27, the determination unit 13 determines whether or not there is a character excluded from selection whose character rectangle overlaps with the finishing-point relief rectangle. If there is a character excluded from selection whose character rectangle overlaps with the finishing-point relief rectangle (OP27: YES), the process proceeds to OP28. If there is not a character excluded from selection whose character rectangle overlaps with the finishing-point relief rectangle (OP27: NO), the process illustrated in FIG. 9C is ended.

In OP28, the determination unit 13 adds the character excluded from selection whose character rectangle overlaps with the finishing-point relief rectangle, to the selection target. The process illustrated in FIG. 9C is then ended. Upon the end of the process illustrated in FIG. 9C, the determination unit 13 outputs the character rectangles of the selection target characters as the selection target region to the display processing unit 14, and the display processing unit 14 changes display of the selection target region to highlighted display.

<Operations and Effects of First Embodiment>

In the first embodiment, the mobile terminal 1 detects character rectangles that overlap with the touch track, as the selection target region. This enables the user to select desired characters with no undesired character being included, and hence character selection through the touch panel can be facilitated.

Moreover, in the first embodiment, the mobile terminal 1 performs the relief processes 1 and 2 for a character excluded from selection, whereby a character that does not overlap with the touch track for the reason of having a small character rectangle size but is estimated to be included in the selection target of the user can be added to the selection target.

According to the information processing apparatus and the information processing program disclosed above, selection of a character region can be facilitated.

<Others>

In the first embodiment, the selection target region is detected on the basis of the track encompassing rectangle and the character rectangles, but the shapes of the range including the entire touch track and the range including a unit of a predetermined number of characters are not limited to a rectangle. For example, the shapes of these ranges may be an oval.

Note that the character selection process using the touch panel is described in the first embodiment, but application of the technique described in the first embodiment is not limited to the information processing apparatus including the touch panel. For example, the technique described in the first embodiment can also be applied to the character selection process using a pointing device such as a mouse, and can be achieved by detecting, as the selection target region, character rectangles that overlap with the track of a pointer of the pointing device.

Another aspect of the present invention provides an information processing method in which an information processing apparatus performs the above-mentioned process. Still another aspect of the present invention can include: an information processing program causing a computer to function as the above-mentioned information processing apparatus; and a computer-readable recording medium that records the program therein. The recording medium readable by the computer and the like refers to a recording medium that non-transitory accumulates therein information of data, programs, and the like through an electrical, magnetic, optical, mechanical, or chemical action and allows the computer and the like to read the accumulated information.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a processor;
a touch panel; and
a display configured to display a screen,
wherein the processor is configured to:
receive input of touch coordinates through the touch panel;
acquire a rectangle on the screen, wherein the rectangle is a part of the screen and encompassing a whole of a touch track on the screen, and wherein the touch track is obtained by connecting the touch coordinates in order of inputting;
analyze the rectangle by a character recognition engine, to acquire a plurality of character regions in the rectangle, wherein each of the plurality of character regions includes a predetermined number of characters;
determine, as a selected region, one or more first character regions overlapping the touch track without one or more second character regions not overlapping the touch track selected when the touch track crosses a plurality of rows in the rectangle and the plurality of rows includes the one or more first and second character regions; and
perform a predetermined process on the selected region, wherein
the processor is configured to add, to the selected region, a character region that does not overlap with the touch track and is sandwiched between at least two first character regions that overlap with the touch track.

2. An information processing apparatus comprising:
a processor;
a touch panel; and
a display configured to display a screen,
wherein the processor is configured to:
receive input of touch coordinates through the touch panel;
acquire a rectangle on the screen, wherein the rectangle is a part of the screen and encompassing a whole of a touch track on the screen, and wherein the touch track is obtained by connecting the touch coordinates in order of inputting;
analyze the rectangle by a character recognition engine, to acquire a plurality of character regions in the rectangle, wherein each of the plurality of character regions includes a predetermined number of characters;
determine, as a selected region, one or more first character regions overlapping the touch track without one or more second character regions not overlapping the touch track selected when the touch track crosses a plurality of rows in the rectangle and the plurality of rows includes the one or more first and second character regions; and
perform a predetermined process on the selected region, wherein
the processor is configured to add, to the selected region, a character region that does not overlap with the touch track, overlaps with a range from an edge point of the touch track to one of the one or more first character regions, and exists within the same row as the one of the one or more first character regions, the one of the one or more first character regions not including the edge point, being closest to the edge point, and overlapping with the touch track.

3. An information processing apparatus comprising:
a processor;
a touch panel; and
a display configured to display a screen,
wherein the processor is configured to:
receive input of touch coordinates through the touch panel;
acquire a rectangle on the screen, wherein the rectangle is a part of the screen and encompassing a whole of a touch track on the screen, and wherein the touch track is obtained by connecting the touch coordinates in order of inputting;
analyze the rectangle by a character recognition engine, to acquire a plurality of character regions in the rectangle, wherein each of the plurality of character regions includes a predetermined number of characters;
determine, as a selected region, one or more first character regions overlapping the touch track without one or more second character regions not overlapping the touch track selected when the touch track crosses a plurality of rows in the rectangle and the plurality of rows includes the one or more first and second character regions; and
perform a predetermined process on the selected region, wherein
the processor is configured to add, to the selected region, a character region that does not overlap with the touch track and overlaps with a first rectangle, a range of the first rectangle in a direction orthogonal to the touch track is same as one of the one or more first character regions, a range of the first rectangle in a direction of the touch track is a range from a first edge point to a point on the one of the one or more first character regions, the first edge point of the touch track exists out of the first character region, the one of the one or more first character regions is closest to the first edge point of the touch track and overlaps with the touch track, and the point exists closest to the first edge point in the one of the one or more first regions.

* * * * *